United States Patent
Yamauchi (10) Patent No.: US 6,307,594 B1
(45) Date of Patent: Oct. 23, 2001

(54) METHOD AND DEVICE FOR SYNCHRONIZING CODED SIGNALS

(75) Inventor: Tatsuo Yamauchi, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 0 days.

(21) Appl. No.: 09/551,895

(22) Filed: Apr. 19, 2000

(30) Foreign Application Priority Data

Apr. 30, 1999 (JP) .................................................. 11-123731

(51) Int. Cl.[7] .............................. H04N 5/06; H04N 9/45; H04N 9/455; H04N 9/475
(52) U.S. Cl. ......................... 348/512; 348/513; 348/516; 348/521
(58) Field of Search .................................... 348/512, 513, 348/516, 518, 521, 536; 370/543, 506, 509–514, 516; H04N 9/475, 5/06, 9/45, 9/455

(56) References Cited

U.S. PATENT DOCUMENTS

| | | | |
|---|---|---|---|
| 5,629,740 | * | 5/1997 | Tanaka et al. .................. 348/515 |
| 5,913,190 | * | 6/1999 | Fielder et al. .................. 370/509 |

FOREIGN PATENT DOCUMENTS

98024/1999   4/1999  (JP) .

* cited by examiner

Primary Examiner—Michael Lee
Assistant Examiner—Brian Yenke
(74) Attorney, Agent, or Firm—Venable; Robert J. Frank; Michael A. Sartori (57) ABSTRACT

A coded signal synchronizing device includes a first and a second signal synchronizing circuit. The first and second signal synchronizing circuits respectively feed a first and a second coded signal to a coded signal processor while synchronizing them to each other in accordance with a reference synchronizing signal. A synchronization control circuit compares the phases of frame synchronizing signals output by the decoding of the coded signals and the phase of the reference synchronizing signal. So long as a phase difference between either one of the frame synchronizing signals and the reference synchronizing signal lies in a preselected range, the synchronization control circuit reads the coded signal sequentially stored. If the phase difference is smaller than a first preselected value, the synchronization control circuit repeatedly reads an I (Intra-coded) picture two times. On the other hand, if the phase difference is greater than a second preselected value, the synchronization control circuit omits a preselected decoded picture signal while re-encoding other decoded pictures in a preselected section.

10 Claims, 5 Drawing Sheets

METHOD AND DEVICE FOR SYNCHRONIZING CODED SIGNALS

BACKGROUND OF THE INVENTION

1. Field of the Invention

The present invention relates to a device for processing coded signals and a method of synchronizing coded signals. More particularly, the present invention relates to a coded signal processing device and a coded signal synchronizing method advantageously applicable to the processing of coded signals not synchronized to transmit or store the processed coded signals.

2. Description of the Background Art

It is a common practice to transmit a TV (television) or similar moving picture signal or store it in a desired recording medium by efficiently compressing it by use of an MPEG (Moving Picture Experts Group) or similar coding system. On the other hand, to combine two television signals not synchronized with each other or to switch from one to the other, it has been customary to synchronize them with, e.g., frame synchronizers and then combine or switch the resulting signals frame by frame or field by field. The frame synchronizers each separate a vertical and a horizontal synchronizing signal from the respective TV signal and write the TV signal in a buffer memory in accordance with the above two synchronizing signals. The TV signals are read out of the individual buffer memories in synchronization with each other in accordance with a vertical and a horizontal synchronizing signal derived from a reference synchronizing signal generated in local. The TV signals are then subjected to preselected processing.

A coded signal processing device of the type using the above frame synchronizers is conventional as a device for processing two different coded video signals and transmitting or storing the processed coded signals. This type of device, however, needs two decoders each for decoding a particular coded signal, e.g., an MPEG coded signal, two encoders for reproducing the original TV signals or composite signals from decoded component signals made up of a luminance signal (Y) and chrominance signals (C), the two frame synchronizers, a signal processor for executing combination, switching or similar signal processing, a decoder for converting the composite signals to component signals, and an encoder for again coding the component signals with a preselected coding system.

The two decoders each decode a particular coded signal input to the device and thereby output a digital component signal made up of a Y signal and C signals. The two encoders respectively transform the component signals output from the two decoders to composite signals on which the Y and C signals are superposed. The composite signals are converted to the original analog TV signals and then input to the frame synchronizers. At this instant, frame-by-frame or field-by-field horizontal and vertical synchronizing signals are separated from the TV signals and also input to the frame synchronizers.

Each frame synchronizer digitizes the TV signal input thereto and writes the resulting digital picture data in the respective buffer memory in accordance with a horizontal and a vertical synchronizing signal fed from the encoder. Such TV signals are read out of the buffer memories in accordance with a horizontal and a vertical synchronizing signal common to them and fed to the signal processor.

The signal processor combines the two synchronous video signals or switches them scene by scene to thereby output a single video signal. The video signal output from the signal processor is again converted to an analog signal and then transformed to Y and C component signals by the decoder. The encoder codes the component signals with, e.g., the MPEG coding scheme. The resulting coded signals are transmitted or written to a desired recording medium as efficiently compressed coded signals.

However, the problem with the conventional coded signal processing device must execute a sequence of steps of decoding coded video signals input thereto, converting the decoded signals to preselected signals, transforming the converted signals to analog signals, digitizing the resulting analog signals, and then processing the resulting digital signals, again transforming the processed digital signals to analog signals, again converting the analog signals to preselected signals, again digitizing the converted signals, and then coding the resulting digital signals. Image quality is deteriorated every time the signals are subjected to a signal conversion step.

SUMMARY OF THE INVENTION

It is therefore an object of the present invention to provide a coded signal processing device and a coded signal synchronizing method capable of executing a signal processing with a coded signal while synchronizing it to a preselected synchronizing signal in the form of a coded signal, and therefore allowing deterioration in image quality to be minimized.

In accordance with the present invention, a coded signal processing device for executing preselected processing with a coded signal representative of a moving picture and coded by a preselected coding system and outputting a processed coded signal includes a code storage for sequentially storing an input coded signal. A decoder decodes the input coded signal to thereby produce an original moving picture signal. An encoder again codes the moving picture signal output from the decoder by the preselected coding system. A selector selectively outputs a coded signal output from the encoder or the coded signal read out of the code storage. A signal controller controls the reading of the coded signal out of the code storage, the output of the coded signal from the encoder, and the switching of the selector. The signal controller causes the code storage or the encoder to output the coded signal based on a preselected reference synchronizing signal which is a reference for a frame synchronizing signal included in the moving picture signal while synchronizing the coded signal frame by frame, and causes the selector to select the coded signal. A coded signal processor executes the preselected processing with the coded signal selected by the selector to thereby process the moving picture, and outputs the coded signal in the form of a coded signal.

Also, in accordance with the present invention, a method of processing a coded signal representative of a moving picture coded by a preselected coding system while synchronizing the coded signals includes the steps of (a) decoding the coded signal to thereby detect a synchronizing signal picture by picture, (b) comparing the synchronizing signal with a preselected reference synchronizing signal to thereby detect a phase difference, (c) temporarily storing the coded signal and reading out the coded signal in accordance with the reference synchronizing signal, (d) again coding one by one moving picture signals produced by decoding the coded signal, (e) selecting and then processing either one of the coded signal read out in step (c) and a coded signal output by step (d), (f) repeatedly reading out, when the phase difference detected in step (b) is smaller than a first preselected value, an intra-coded frame two times for synchronization in step (c), (g) omitting, when the phase difference detected in step (b) is greater than a second preselected value, any one of inter-coded frames of the moving picture signal decoded in step (d) and appearing between two consecutive intra-coded frames, while re-encoding the moving picture signal of the other frames to thereby synchronize the coded signal to the reference synchronizing signal.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENTS

Figure 1:
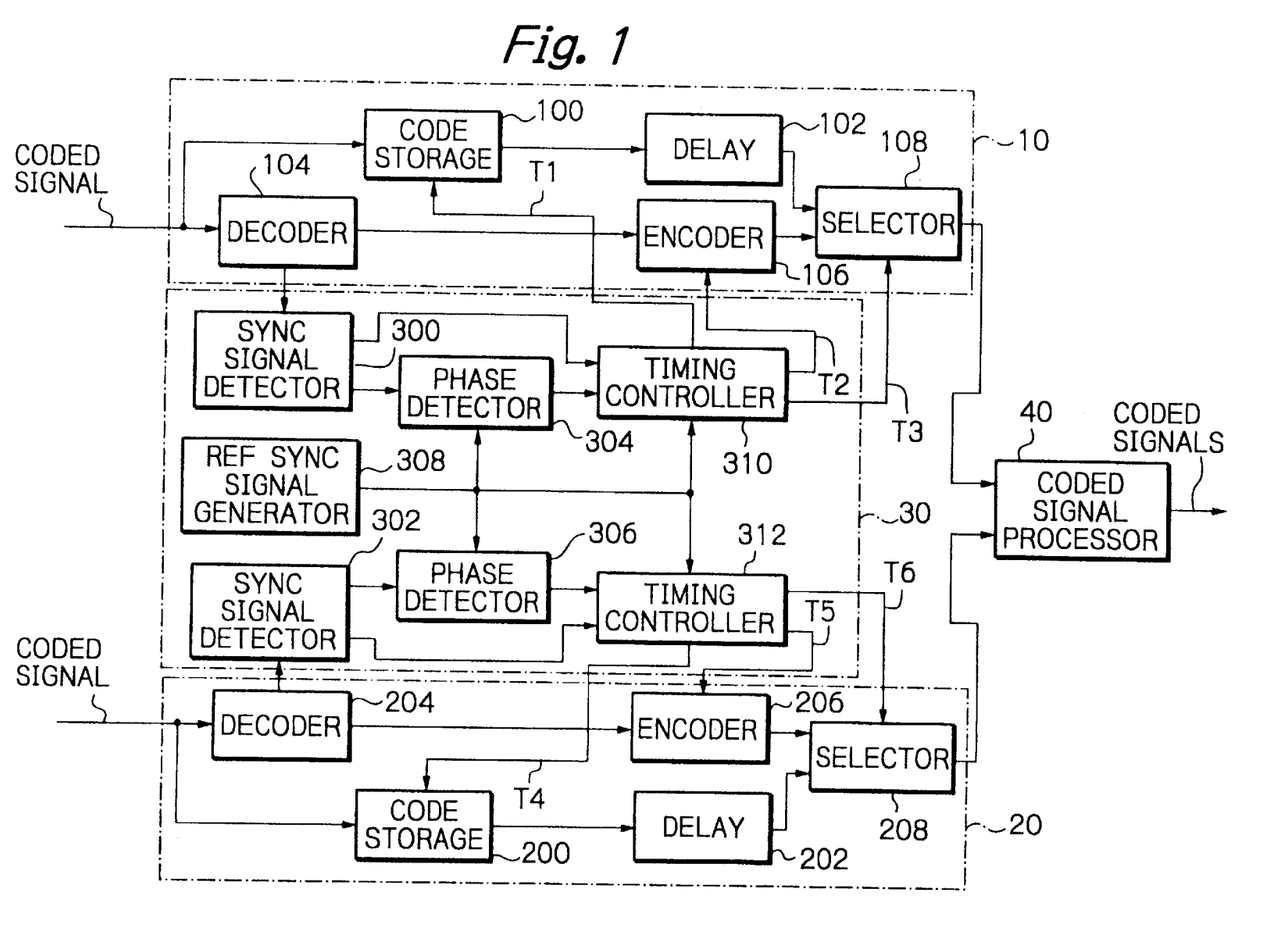
FIG. 1 is a block diagram schematically showing a coded signal processing device embodying the present invention.

Referring to FIG. 1 of the drawings, a coded signal processing device embodying the present invention is shown. Briefly, in the illustrative embodiment, two coded signals, which produced by coding TV signals or similar moving picture signals by, e.g., the MPEG scheme and are not assured to be synchronized with each other, are input to the processing device. To allow the coded signals to be combined or switched scene by scene, the processing device synchronizes the coded signals to each other.

Particularly, to synchronize the two coded signals with a reference synchronizing signal generated locally in the processing device, the device has a first path and a second path each detecting a phase difference between the frame synchronizing signal of an moving picture signal produced by decoding a particular coded signal and the reference synchronizing signal. If the phase difference is smaller than a first preselected value, the first path inserts an intra-coded frame. If the phase difference is greater than a second preselected value, the second path omits an inter-coded frame appearing between two consecutive intra-coded frames while again subjecting the moving picture signal of the other frames to inter-coding.

As shown in FIG. 1, the coded signal processing device includes a first signal synchronizing circuit 10, a second signal synchronizing circuit 20, a synchronization control circuit 30, and a coded signal processor 40. The first signal synchronizing circuit 10 synchronizes a first coded signal input thereto to a preselected reference synchronizing signal under the control of the synchronization control circuit 30, and feeds the synchronized coded signal to the coded signal processor 40. In the illustrative embodiment, the synchronizing circuit 10 has a signal path including a first code storage 100 and a first delay 102, a signal path including a first decoder 104 and a first encoder 106, and a selector or switch 108 for selecting either one of the two paths.

The first code storage 100 is a buffer memory for sequentially storing the first coded signal input to the first synchronizing circuit 10. The coded signal is read out of the storage 100 frame by frame in accordance with a control signal T1 output from the synchronization control circuit 30. Particularly, assume that a phase difference between the reference synchronizing signal and the frame synchronizing signal of a moving picture signal produced by decoding the first coded signal is smaller than a preselected value. Then, in the illustrative embodiment, an I picture immediately following the above first coded signal is repeatedly read out two times with the result that the coded signal is synchronized to the reference synchronizing signal, as will be described later in detail. The coded signal input to the code storage 100 is made up of, e.g., I (Intra-coded) pictures, P (Predictive-coded) pictures and B (Bidirectionally Predictive-coded) pictures coded every preselected frame or frames each.

The first delay 102 delays the coded signal read out of the first code storage 100 by a preselected period of time which is, in the illustrative embodiment, long enough for the first encoder 106 to perform coding. The coded signal output from the delay 102 is fed to the coded signal processor 40 via the first selector 108.

The first decoder 104 is an MPEG-adaptive decoder and decodes the first coded signal to reproduce the original moving picture signal. The reproduced moving picture signal is fed from the decoder 104 to the first encoder 106. In the illustrative embodiment, the decoded moving picture signal is delivered to the synchronization control circuit 30 also.

The above encoder 106 re-encodes the moving picture signal fed from the first decoder 104 by the same MPEG coding scheme as applied to the original coded signal. In the illustrative embodiment, the encoder 106 codes the moving picture signal in accordance with a control signal T2 output from the synchronization control circuit 30 while sequentially delivering the coded signal to the selector 108 frame by frame. Particularly, assume that a phase difference between the reference synchronizing signal and the frame synchronizing signal of the moving picture signal derived from the first coded signal is greater than a preselected value. Then, in the illustrative embodiment, the encoder 106 omits the moving picture signal of a preselected frame instead of coding it and re-encodes the moving picture signals of the other frames, appearing between two consecutive intra-coded frames respectively, thereby synchronizing the first coded signal to the reference synchronizing signal.

The first selector 108 selects either one of the output of the delay 102 and the output of the encoder 106 and feeds it to the coded signal processor 40. In the illustrative embodiment, the selector 108 may advantageously be implemented by a switching device operated by a control signal T3 output from the synchronization control circuit 30. Specifically, the selector 108 is selects the signal out of the encoder 106 for a preselected period of time only when, e.g., the phase difference between the reference synchronizing signal and the frame synchronizing signal of the moving picture signal derived from the first coded signal is greater than a preselected value; otherwise, the selector 108 selects the signal out of the delay 102.

The second signal synchronizing circuit 20 synchronizes a second coded signal input thereto to the reference synchronizing signal under the control of the synchronization control circuit 30, and feeds the resulting signal to the coded signal processor 40. The second signal synchronizing circuit 20, like the first signal synchronizing circuit 10, has a signal path including a second code storage 200 and a second delay 202, a signal path including a second decoder 204 and a second encoder 206, and a second selector or switch 208 for selecting either one of the two signal paths.

The storage 200 is a buffer memory for sequentially storing the second coded signal input thereto. The second coded signal is read out of the storage 200 frame by frame in accordance with a control signal T4 output from the synchronization control circuit 30. Assume that a phase difference between the reference synchronizing signal and the frame synchronizing signal of a moving picture signal produced by decoding the second coded signal is smaller than a preselected value. Then, an I picture appearing immediately after the above second coded signal is repeatedly read out two consecutive times with the result that the second coded signal is synchronized to the reference synchronizing signal. The coded signal input to the code storage 200, like the first coded signal, is a signal made up of I pictures, P pictures and B pictures subjected to MPEG coding.

The delay 202 delays the second coded signal read out of the code storage 200 by a preselected period of time which is, in the illustrative embodiment, long enough for the encoder 206 to perform coding. The coded signal output from the delay 202 is fed to the coded signal processor 40 via the selector 208.

The decoder 204, like the previously stated decoder 104, is an MPEG-adaptive decoder and decodes the second coded signal to reproduce the original moving picture signal. The reproduced moving picture signal is fed from the decoder 204 to the encoder 206 and synchronization control circuit 30.

The encoder 206 re-encodes the moving picture signal fed from the decoder 204 by the same MPEG coding scheme as applied to the original coded signal. The encoder 206 codes the moving picture signal in accordance with a control signal T5 output from the synchronization control circuit 30 while sequentially delivering the coded signal to the second selector 208 frame by frame. Again, assume that a phase difference between the reference synchronizing signal and the frame synchronizing signal of the moving picture signal derived from the second coded signal is greater than a preselected value. Then, the encoder 206, like the encoder 106, omits the moving picture signal of a preselected frame instead of coding it and reencodes the moving picture signals of the other frames appearing between two consecutive intra-coded frames respectively, thereby synchronizing the second coded signal to the reference synchronizing signal.

The selector 208 selects either one of the output of the delay 102 and the output of the encoder 206 and feeds it to the coded signal processor 40 in accordance with a control signal T6 output from the synchronization control circuit 30. The selector 208, like the selector 108, selects the output of the encoder 206 for a preselected period of time only when, e.g., a phase difference between the reference synchronizing signal and the frame synchronizing signal of the moving picture signal derived from the second coded signal is greater than a preselected value; otherwise, the selector 208 selects the output of the delay 202.

The synchronization control circuit 30 synchronizes the first and second coded signals to the reference synchronizing signal by controlling the first and second signal synchronizing circuits 10 and 20. In the illustrative embodiment, the synchronization control circuit 30 includes a fist and a second synchronizing signal detector 300 and 302, respectively, a first and a second phase detector 304 and 306, respectively, a reference synchronizing signal generator 308, and a first and a second timing controller 310 and 312, respectively.

The first synchronizing signal detector 300 detects a frame synchronizing signal out of the moving picture signal fed from the first decoder 104 and delivers the result of detection to the first phase detector 304. In addition, in the illustrative embodiment, the synchronizing signal detector 300 references the picture header of the coded signal frame in order to determine the kind of the picture of the frame (I picture, P picture or B picture) and feeds a signal representative of the kind to the first timing controller 310.

Likewise, the second synchronizing signal detector 302 detects a frame synchronizing signal out of the moving picture signal fed from the second decoder 204 while determining the kind of a picture. The synchronizing signal detector 302 delivers the result of detection and the kind of a picture to the second phase detector 306 and second timing controller 312, respectively.

The first phase detector 304 compares the phase of the frame synchronizing signal detected by the first synchronizing signal detector 300 and the phase of the reference synchronizing signal output from the reference synchronizing signal generator 308. The phase detector 304 feeds a signal representative of a phase difference between the above two signals to the first timing controller 310. Likewise, the second phase detector 306 compares the phase of the frame synchronizing signal detected by the second synchronizing signal detector 302 and the phase of the reference synchronizing and feeds a signal representative of the resulting phase difference to the second timing controller 312.

The reference synchronizing signal generator 308 is an oscillation circuit including, e.g., a VCO (Voltage Controlled Oscillator) capable of generating a reference synchronizing signal having a preselected frequency. In the illustrative embodiment, the generator 308 outputs a frame synchronizing signal corresponding to a moving picture signal having thirty frames per second. The reference synchronizing signal is input to the first and second phase detectors 304 and 306 and first and second timing controllers 310 and 312.

The first timing controller 310 basically feeds the control signals to the first signal synchronizing circuit 10 in accordance with the reference synchronizing signal output from the reference synchronizing signal generator 308. In response, the signal synchronizing circuit 10 outputs a first coded signal in synchronization with the reference synchronizing signal. In the illustrative embodiment, the timing controller 310 plays the role of a control signal generator for generating the three different control signals T1, T2 and T3 on the basis of the outputs of the first phase detector 304 and first synchronizing signal detector 300. The control signal T1 controls the reading of the coded signal out of the first code storage 100. The control signal T2 controls the coding timing of the first encoder 106. The control signal T3 controls the switching timing of the first selector 108.

For example, assume that a phase difference output from the first phase detector 304 lies in a preselected range. Then, the above control signal T1 is fed to the first code storage 100 in synchronism with the reference synchronizing signal, so that the coded signal is sequentially read out of the storage 100 frame by frame. If the phase difference is smaller than a first preselected value a and if an identification signal output from the fist synchronizing signal detector 300 is representative of an I picture, the control signal T1 causes a coded signal representative of an I picture to be read two consecutive times out of the code storage 100 in synchronism with the reference synchronizing signal. While the coded signal is being read out of the code storage 100, the control signal T3 is fed to the selector 108 for causing it to select the above coded signal.

The control signal T2 is fed from the timing controller 310 to the encoder 106 if the phase difference detected by the phase detector 304 is greater than a second preselected value β and if the identification signal output from the synchronizing signal detector 300 is representative of an I picture. The control signal T2 causes a moving picture signal representative of a B picture appearing after the I picture to be omitted while causing the moving picture signal to be re-encoded over the other frames and sequentially output. When an identification signal representative of the next I picture is output from the synchronizing signal detector 300, the control signal T2 causes the output of the coded signal to end. While the coded signal is being output from the encoder 106, the control signal T3 for causing the selector 108 to select the above coded signal is fed to the switch selector.

Likewise, the second timing controller 312 feeds the control signals to the second signal synchronizing circuit 20 in accordance with the reference synchronizing signal output from the reference synchronizing signal generator 308. In response, the signal synchronizing circuit 20 outputs a second coded signal in synchronization with the reference synchronizing signal. The timing controller 312, like the timing controller 310, plays the role of a control signal generator for generating the three different control signals T4, T5 and T6 on the basis of the outputs of the second phase detector 306 and second synchronizing signal detector 302. The control signal T4 controls the reading of the coded signal out of the second code storage 200. The control signal T5 controls the coding timing of the second encoder 206. The control signal T6 controls the switching timing of the second selector 208.

On the other hand, the coded signal processor 40 executes preselected processing with the first and second coded signals fed from the first and second signal synchronizing circuits 10 and 20, respectively. In the illustrative embodiment, the coded signal processor 40 outputs the coded signals after combining them or after switching them scene by scene. The processor 40 may be implemented by an arrangement disclosed in, e.g., Japanese patent laid-open publication No. 98024/1999 assigned to the same assignee as the present application.

Reference will be made to FIGS. 2A–2D and 3A–3D for describing a coded signal synchronizing procedure practicable with the illustrative embodiment. When the first and second coded signal each are sequentially input to the device, the first coded signal is sequentially written to the first code storage 100 and decoded by the first decoder 104. Likewise, the second coded signal is sequentially written to the second code storage 200 and decoded by the second decoder 204.

The first synchronizing signal detector 300 detects a frame synchronizing signal out of a moving picture signal output from the first decoder 104 and feeds it to the first phase detector 304. At this instant, the synchronizing signal detector 300 distinguishes the picture type of the first coded signal frame by frame while delivering the resulting identification signals to the first timing controller 310. Likewise, the second synchronizing signal detector 302 detects a frame synchronizing signal out of a moving picture signal output from the second decoder 204 and feeds it to the second phase detector 306. The synchronizing signal detector 302 distinguishes the picture type of the second coded signal frame by frame while delivering the resulting identification signals to the second timing controller 312.

The reference synchronizing signal generator 308 feeds the reference synchronizing signal to the first and second phase detectors 304 and 306 and first and second timing controllers 310 and 312.

The first phase detector 304 compares the phase of the frame synchronizing signal of the moving picture signal derived from the first coded signal and the phase of the reference synchronizing signal and sequentially feeds signals representative of phase differences between them to the first timing controller 310. Likewise, the second phase detector 306 compares the phase of the frame synchronizing signal of the moving picture signal derived from the second coded signal and the phase of the reference synchronizing signal and sequentially feeds signals representative of phase differences between them to the second timing controller 312.

So long as the phase difference output from the first phase detector 304 lies in a preselected range, the first timing controller 310 generates the control signal T1 synchronous to the reference synchronizing signal and feeds it to the first code storage 100. At the same time, the timing controller 310 generates the control signal T3 for selecting the output of the code storage 100 and delivers it to the first selector 108. Likewise, so long as the phase difference output from the second phase detector 306 lies in a preselected range, the second timing controller 312 generates the control signal T4 synchronous to the reference synchronizing signal and feeds it to the second code storage 200. At the same time, the timing controller 312 generates the control signal T6 for selecting the output of the code storage 200 and delivers it to the second selector 208.

As stated above, the first and second coded signals are sequentially read out of the first and second code storages 100 and 200, respectively, frame by frame in accordance with the reference synchronizing signal. Subsequently, the signals read out of the storages 100 and 200 are respectively routed through the first and second delays 102 and 202 and first and second selectors 108 and 208 to the coded signal processor 40.

Assume that while the first and second coded signals are being fed to the coded signal processor 40 in synchronization with the reference synchronizing signal, the phase of the first coded signal is advanced. Then, the first phase detector 304 compares the phase of the frame synchronizing signal of a moving picture signal derived from such a coded signal and that of the reference synchronizing signal and feeds the result of comparison to the first timing controller 310.

Figure 2A:
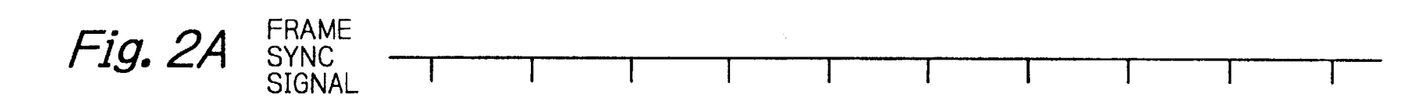
FIGS. 2A–2D are timing charts demonstrating a specific operation which the illustrative embodiment performs when the frequency of a frame synchronizing signal is lower than the frequency of a reference synchronizing signal.
Figures 2B, 2C:
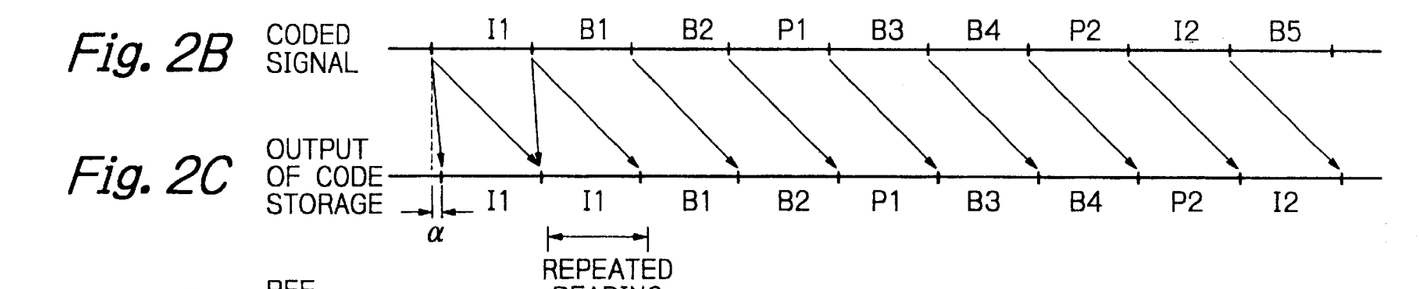
Figure 2D:
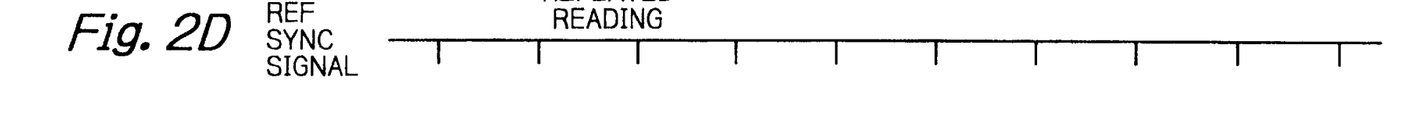

For example, assume that the first coded signal shown in FIG. 2B has a frame synchronizing signal shown in FIG. 2A which is lower in frequency than the reference synchronizing signal shown in FIG. 2D. Then, the phase of the frame synchronizing signal is retarded relative to the phase of the reference synchronizing signal, causing the phase difference between the frame synchronizing signal and reference synchronizing signal to sequentially decrease. This is apt to prevent the coded signal from being correctly read out of the code storage 100 in the end.

In light of the above, the illustrative embodiment executes the following processing when the above phase difference decreases below the first preselected value a. On receiving an identification signal representative of an I picture (I1 picture hereinafter) from the first synchronizing signal detector 300 after the decrease of the phase difference, the timing controller 310 causes the I1 picture to be read out of the first code storage 100 in response to the reference synchronizing signal and then causes the same I1 picture to be read out again in response to the next reference synchronizing signal. Thereafter, the timing controller 310 causes the coded signal sequentially written to the code storage 100 frame by frame to be read out in accordance with the reference synchronizing signal and fed to the coded signal processor 40 via the delay 102 and selector 108.

Likewise, assume that the phase of the second coded signal is retarded to such a degree that the phase difference between the frame synchronizing signal of the decoded moving picture signal and the reference synchronizing signal decreases below the preselected value α. Then, on receiving a signal representative of the decrease of the phase difference from the second phase detector 306, the second timing controller 312 causes an I picture to be read out of the second code storage 200 in response to the reference synchronizing signal and causes the same I picture to be read out again in response to the next reference synchronizing signal. It is to be noted that the preselected value a is selected on the basis of a phase difference to occur when the phase of the reference synchronizing signal presumably gets ahead of the phase of the frame synchronizing signal during the interval between one I picture and the next I picture.

On the other hand, when the frequency of the frame synchronizing signal is higher than the frequency of the reference synchronizing signal, it is likely that the phase of the first coded signal is advanced and the phase difference between the frame synchronizing signal and the reference synchronizing signal increases little by little. This is also apt to prevent the coded signal from being correctly read out of the code storage 100 in the end. In the illustrative embodiment, when the first synchronizing signal detector 300 detects the frame synchronizing signal of a decoded moving picture signal, it feeds the frame synchronizing signal to the first phase detector 304. In response, the phase detector 304 determines a phase difference between the frame synchronizing signal and the reference synchronizing signal and delivers the resulting phase difference to the first timing controller 310.

Figure 3A:
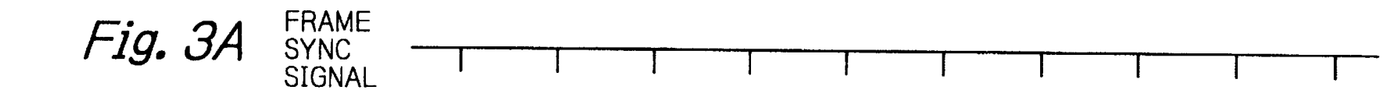
FIGS. 3A–3D are timing charts demonstrating another specific operation which the illustrative embodiment performs when the frequency of frame synchronizing signal is higher than the frequency of the reference synchronizing signal.
Figure 3B:
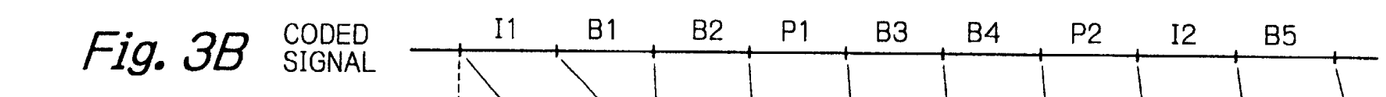
Figures 3C, 3D:
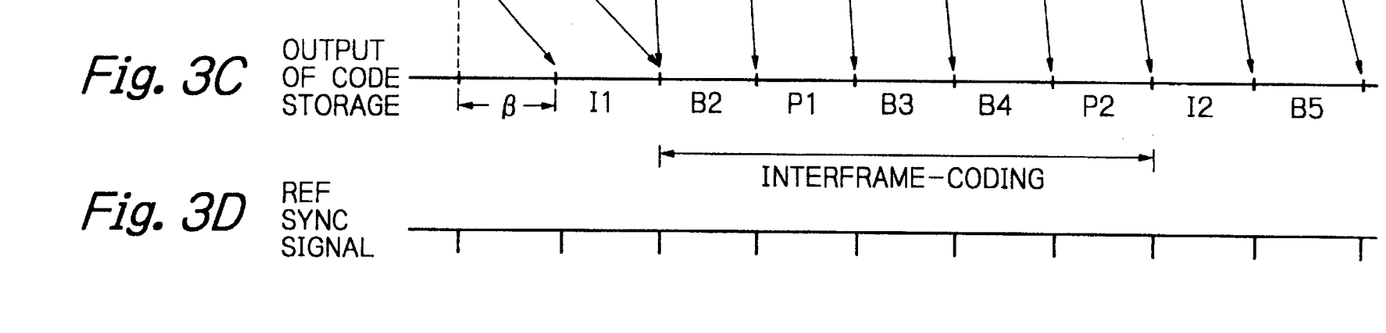

At the above stage of operation, assume that the phase of the frame synchronizing signal of the moving picture signal shown in FIG. 3A and decoded by the decoder 104 is advanced than that of the reference synchronizing signal shown in FIG. 3D by more than the second preselected value β. Then, when the synchronizing signal detector 300 detects an I picture (I1 picture), the first timing controller 310 feeds the control signal T2 to the first encoder 106 for causing it to start outputting a coded signal. At the same time, the timing controller 310 feeds the control signal T3 to the first selector 108 for causing it to select the coded signal output from the encoder 106. It is to be noted that the second preselected value β is selected on the basis of a phase difference to occur when the phase of the reference synchronizing signal and that of the frame synchronizing signal presumably cross each other during the interval between one I picture and the next I picture.

In response to the control signal T2, the encoder 106 first executes intraframe coding with the moving picture signal of the I1 picture received from the decoder 104 and outputs the resulting coded I1 picture in response to the reference synchronizing signal. Subsequently, the encoder 106 codes the moving picture signals of the frames by using interframe coding after I1 picture except for a preselected frame.

For example, the encoder 106 omits, or does not code, the moving picture signal produced by decoding a B1 picture included in the first coded signal shown in FIG. 3B. Instead, the encoder 106 again codes a moving picture signal produced by decoding the following B2 picture, thereby generating the B2 picture. The encoder 106 then outputs the coded signal of the B2 picture in response to the reference synchronizing signal following the reference synchronizing signal used to output the coded signal of the I1 picture. Thereafter, the encoder 106 re-encodes decoded moving picture signals representative of P1, B3, B4 and P2 pictures sequentially input thereto from the first decoder 104, while sequentially outputting the resulting coded signals frame by frame in accordance with reference synchronizing signal. The coded signals are sequentially input to the coded signal processor 40 via the first selector 108.

Subsequently, the timing controller 310 receives an identification signal representative of an I picture (I2 picture) output from the synchronizing signal detector 300 and causes the encoder 106 to re-encode an I2 picture and output the resulting code. The timing controller 310 then feeds the control signal T2 to the encoder 106 for causing it to stop outputting coded signals. As soon as the above code output S from the encoder 106 is input to the coded signal processor 40 via the selector 108, the timing controller 310 delivers the control signal T3 to the selector 108. In response, the selector 108 again selects the coded signals output from the delay 102 thereof.

After the delivery of the control signal T3 to the selector 108, the timing controller 310 again feeds the control signal T1 to the code storage 100, so that coded signals representative of a B5 picture and successive pictures are read out of the storage 100 in accordance with reference synchronizing signal. These coded signals are also fed to the coding signal processor 40 via the delay 102 and selector 108.

Likewise, assume that the phase of the second coded signal is advanced to such a degree that a phase difference between the frame synchronizing signal of a moving picture signal produced by decoding the coded signal and the reference synchronizing signal exceeds the second value β. Then, on receiving an identification signal representative of the next I picture, the second timing controller 312 feeds a control signal T5 to the second encoder 206.

In response to the control signal T5, the second encoder 206 omits, among the frames of pictures appearing between two consecutive I pictures, the frame of a B picture and re-encodes the moving picture signals of the other frames one by one. The resulting coded signals are fed from the encoder 206 to the coded signal processor 40 via the selector 208. The encoder 206 stops outputting coded signals on reaching the next I picture. At this time, the second selector 208 is again switched to the signal path extending from the second code storage 200 so as to select coded signals following the coded signals output from the second encoder 206 outputted from the storage 200. The coded signals selected by the selector 208 are fed to the coded signal processor 40.

Again, when the phase difference between the frame synchronizing signal of the-moving picture signal and the reference synchronizing signal lies in the preselected range, the first and second timing controllers 320 and 312 respectively cause the coded signals to be read out of the code storages 100 and 200 in accordance with the reference synchronizing signal while causing them to be fed to the coded signal processor 40. When the phase difference between the frame synchronizing signal and the reference synchronizing signal is smaller than the first preselected value a due to the phase delay of the first or second coded signals, the timing controller 310 or 312 repeatedly cases the subsequent I picture two times to be read out of the code storage 100 or 200. When the above difference is greater than the second preselected value β due to the phase advance of the first or second coded signals, the timing controller 310 or 312 causes a frame corresponding to a B picture following the subsequent I picture to be omitted and the moving picture signals of the frames from a picture following the B picture to the next I picture to be re-encoded.

Consequently, the first and second signal synchronizing circuits 10 and 20 deliver the first and second coded signals to the coded signal processor 40 in synchronization with the reference synchronizing signal. The coded signal processor 40 is capable of outputting the first and second coded signals in the form of coded signals after combining them, switching them scene by scene or otherwise processing them.

As stated above, the first and second coded signals are input to the coded signal processing device with particular synchronization each. When a phase difference between the two coded signals and the reference synchronizing signal lies in a preselected range, the device temporarily writes each coded signal in a particular code storage and then reads it out in the form of a coded signal while synchronizing it to the other coded signal by use of a common reference synchronizing signal. On the other hand, if the phase of either one of the two coded signals is retarded, the device repeatedly reads the same I picture included in the retarded coded signal two times. If the phase of either one of the two pictures is advanced, the device omits preselected one of moving picture signals decoded by the decoder and then re-encodes the other decoded signal. In this manner, the device is capable of adjusting the phase of the individual coded signal and thereby setting up accurate phase synchronization without decoding all coded signals input thereto.

Therefore, the illustrative embodiment can feed picture signals with a minimum of deterioration to the coded signal processor 40, compared to conventional circuitry that decodes all coded signals for the synchronizing purpose. This allows the coded signal processor 40 to effectively edit the individually synchronized coded signals, e.g., to switch or wipe the signals.

To better understand the advantage of the illustrative embodiment, a conventional signal processing device of the type using frame synchronizers will be described with reference to FIG. 5. As shown, the signal processing device includes decoders 54 and 56 each for decoding a particular coded signal and thereby outputting a component signal. Encoders 58 and 60 each include an encoder and a digital-to-analog converter (D/A). The encoders 58 and 60 respectively encode the component signals output from the decoders 54 and 56 to thereby output composite signals and transform the composite signals to analog signals. Horizontal/vertical (H/V) separators 62 and 64 each separate a horizontal and a vertical synchronizing signal included in the associated coded signal frame by frame.

Frame synchronizers 50 and 52 each include a analog-to-digital converter (A/D) and a buffer memory 66 or 68. The frame synchronizers 50 and 52 respectively digitize the analog signals output from the encoders 58 and 60 and temporarily write the resulting image data in buffer memories 66 and 68 in synchronism with the synchronizing signals output from the H/V separators 62 and 64. A reference synchronizing signal generator 76 generates a reference synchronizing signal and feeds it to an H/V separator 78 connected thereto. The H/V separator 78 outputs a horizontal and a vertical synchronizing signal H and V, or reference synchronizing signals, based on the reference synchronizing signal output from the reference synchronizing signal generator 76. These synchronizing signals H and V are input to timing controllers 72 and 74.

The frame synchronizers 50 and 52 respectively read the image data out of the buffer memories 66 and 68 in synchronization with the common H and V out of the H/V separator 78. A video signal processor 70 includes a switcher and a D/A. The video signal processor 70 combines the image data, or video signals, fed from the frame synchronizers 50 and 52, or switches them scene by scene and then converts the resulting image data to the analog video signals. Circuitry, not shown, digitizes the video signals output from the video signal processor 70, separates the digitized video signals into a luminance signal (Y) and chrominance signals (C) to thereby output component signals, codes the component signals with a preselected coding scheme, and transmits or records the coded component signals.

Figure 5:
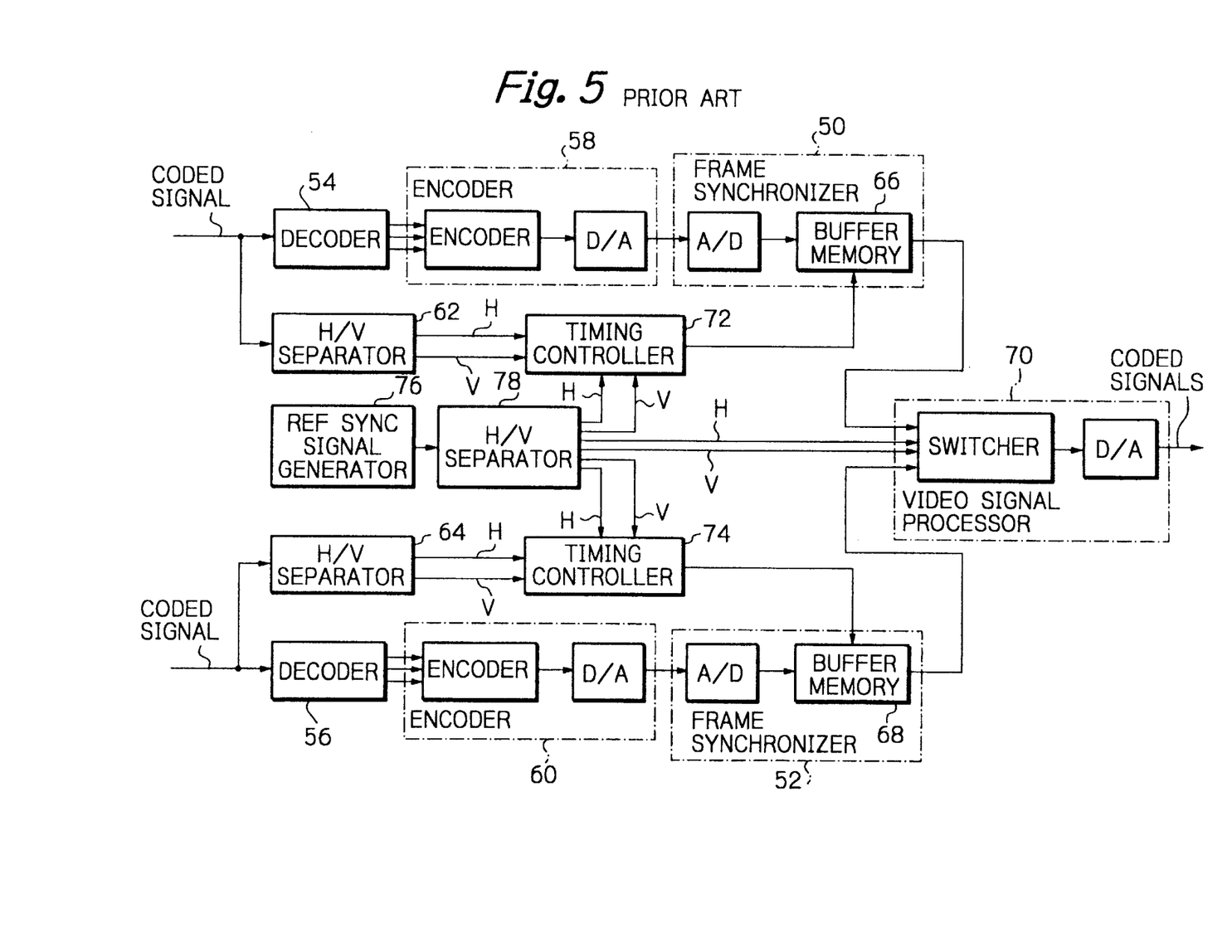
FIG. 5 is a schematic block diagram showing a conventional signal processing device of the type using frame synchronizers.

As stated above, the conventional circuitry of FIG. 5 must process input video signals after executing various kinds of processing including decoding, signal conversion and A/D conversion with the input coded signals and synchronizing the processed signals. Moreover, the comparative circuitry must execute the above processing with all coded signals for the synchronizing purpose, deteriorating image quality to a critical degree. By contrast, in the illustrative embodiment, input signals are not routed through an encoding-decoding path except when a scene is repeated or skipped. The frequency of such an occurrence is derived only from a difference in frequency between synchronizing signals and is not more than once for 1,000 frames on the assumption that the frequency error is about 0.1% of a standard frequency.

Therefore, in the illustrative embodiment, for most of the signals, the signals routed through the bypass paths extending from the code storages 100 and 200 are selected by the selectors 108 and 208. It follows that most of the video signals are implemented by coded signals free from the degradation of image quality. Moreover, the signal path extending via the coding and decoding process, which degrades image quality, does not include the luminance signal and chrominance signal separation and analog conversion process, further reducing the degradation of image quality. The illustrative embodiment is therefore capable of executing effective signal processing involving a minimum of deterioration of image quality, compared to the conventional signal processing device shown in FIG. 5.

Figure 4:
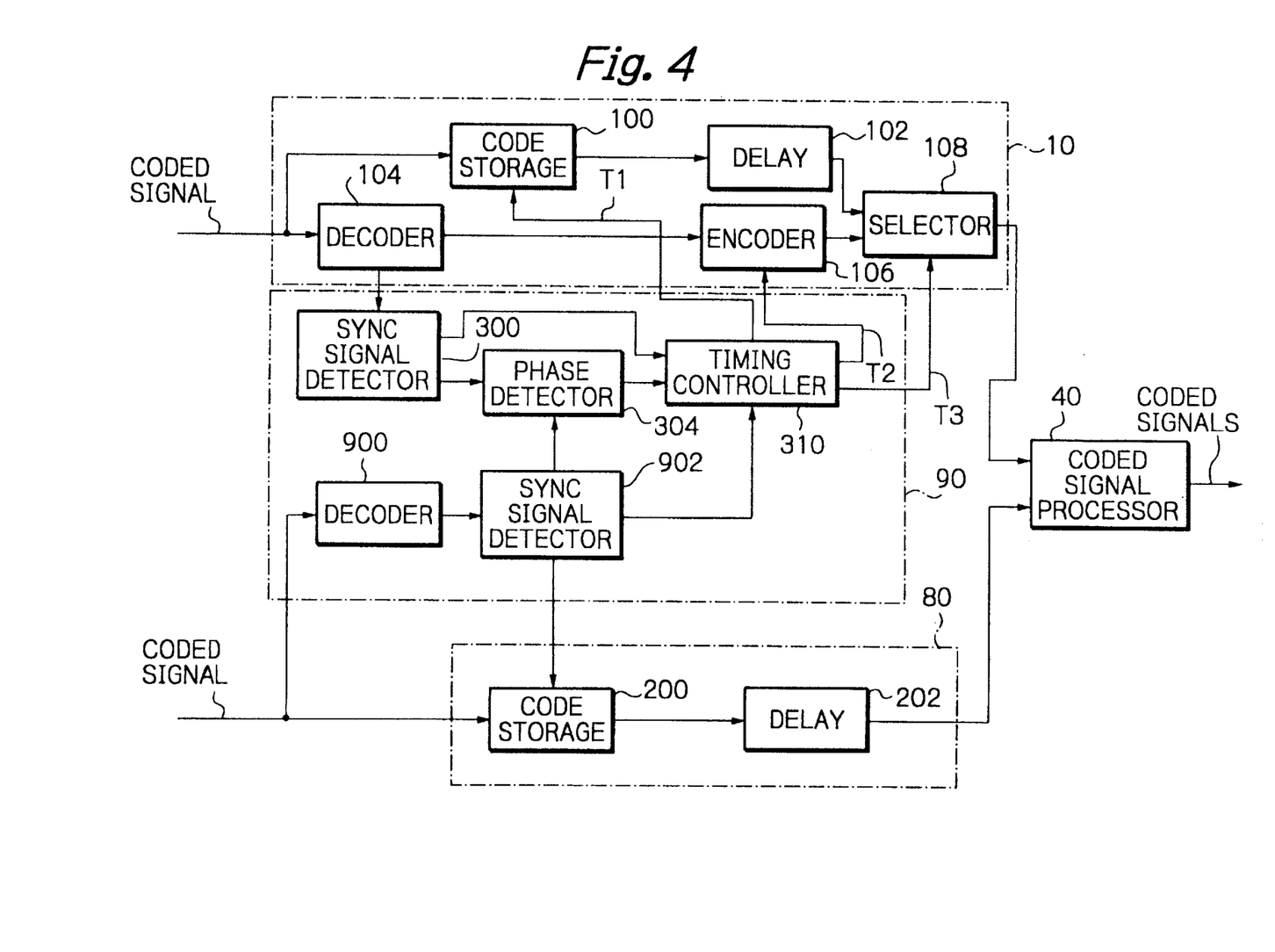
FIG. 4 is a schematic block diagram showing an alternative embodiment of the present invention.

FIG. 4 shows an alternative embodiment of the coded signal processing device in accordance with the present invention. This embodiment differs from the previous embodiment in that it uses the frame synchronizing signal of the moving picture signal of one of the first and second input coded signals as a reference for synchronizing the other coded signal. In FIG. 4, the structural elements identical with the structural elements shown in FIG. 1 are designated by identical reference numerals and will not be described specifically in order to avoid redundancy.

As shown in FIG. 4, the device includes a second synchronizing circuit 80 implemented by a single signal path made up of a second code storage 200 and a second delay 202. That is, the second synchronizing circuit 80 does not have the signal path including the second decoder 204 and second encoder 206 or the second switch 208. The code storage 200 sequentially stores the second coded signal input to the device. The coded signal is sequentially read out of the code storage 200 in synchronization with the frame synchronizing signals of a moving picture signal which a synchronization control circuit 90 outputs by decoding the second coded signal.

The synchronization control circuit 90 includes a first synchronizing signal detector 300, a first phase detector 304, and a first timing controller 310, for controlling the first signal synchronizing circuit 10, as in the previous embodiment. In addition, the circuit 90 includes a decoder 900 for decoding the second coded signal and a synchronizing signal detector 902 for detecting a frame synchronizing signal out of the second coded signal. More specifically, the synchronizing signal detector 902 detects the frame synchronizing signal of the moving picture signal that the decoder 900 outputs by decoding the second coded signal. The detected frame synchronizing signal is fed to the first phase detector 304 and first timing controller 310. Also, the detected frame synchronizing signal is input to the second code storage 200 as a control signal for reading the coded signal out of the storage 200 frame by frame.

In the above configuration, the first coded signal input to the device is sequentially written to the first code storage 100 while being decoded by the first decoder 104, as in the previous embodiment. A moving picture signal output from the first decoder 104 is fed to the first encoder 106 and first synchronizing signal detector 300. The second coded signal An also input to the device is sequentially written to the second code storage 200 while being fed to the synchronization control circuit 90.

In the synchronization control circuit 90, the decoder 900 decodes the second coded signal while the synchronizing signal detector 902 detects a frame synchronizing signal out of the decoded moving picture signal. The detected frame synchronizing signal is applied to the first phase detector 304, first timing controller 310, and second code storage 200. As a result, the coded signal is read out of the code storage 200 frame by frame in response to the frame synchronizing signal.

On the other hand, the first synchronizing signal detector 300 detects a frame synchronizing signal out of a moving picture signal fed from the first decoder 104 while feeding it to the first phase detector 304. In response, the phase detector 304 determines a phase difference between the frame synchronizing signal derived from the first coded signal and the frame synchronizing signal derived from the second coded signal. The phase difference is fed from the phase detector 304 to the first timing controller 310.

So long as the above phase difference lies in a preselected range, the first timing controller 310 feeds the control signal T1 to the first code storage 100 in accordance with the frame synchronizing signal fed from the frame synchronizing signal detector 902 in order to read the first coded signal out of the storage 100 frame by frame. Assume that the frame synchronizing signal derived from the first coded signal has a phase retarded relative to the frame synchronizing signal derived from the second coded signal, and that a phase difference between the former and the latter is smaller than the first preselected value, as in the previous embodiment. Then, the timing controller 310 causes the same I picture to be repeatedly read out of the first code storage two times. On the other hand, assume that the phase of the frame synchronizing signal derived from the first coded signal is advanced relative to the phase of the frame synchronizing signal derived from the second coded signal, and that a difference between the former and the latter is greater than the second preselected value. Then, the timing controller 310 causes a preselected B picture appearing between two consecutive I pictures to be omitted, while causing the moving picture signal of the other pictures to be re-encoded, as in the previous embodiment.

By the above procedure, the synchronization of the first coded signal is adjusted in accordance with the frame synchronizing signal of a moving picture signal produced by decoding the second coded signal. As a result, the first and second coded signals are delivered to the coded signal processor 40 in synchronization with each other. The coded signal processor 40 executes the preselected processing with the first and second coded signals and outputs the processed signals in the from of coded signals, as in-the previous embodiment.

As stated above, the above embodiment synchronizes one of the first and second coded signals in accordance with the frame synchronizing signal of a moving picture signal derived from the other coded signal. The embodiment can therefore process the first or the second coded signal without decoding and re-encoding all of them. It follows that the coded signal used to synchronize the other coded signal prevents image quality from being deteriorated more positively and can be smoothly processed. Moreover, the illustrative embodiment is practicable with a simple, inexpensive circuit arrangement because it does not need the circuit for generating the reference synchronizing signal, among others.

The embodiments shown and described are constructed to synchronize two different coded signals to be processed. The present invention is capable of synchronizing even three or more coded signals or synchronizing a single coded signal to a preselected synchronizing signal, as desired.

While the illustrative embodiments have concentrated on signals coded by the MPEG coding system, the present invention is practicable with any other suitable coding system, e.g., a motion JPEG system including motion compensation.

In summary, in accordance with the present invention, a coded signal processing device synchronizes input coded signals to each other by selecting either the stored coded signals or coded signals produced by re-encoding a decoded moving picture signals based on the phase of the frame synchronizing signals detected at the time of decoding of the coded signals. The device therefore does not have to decode all coded signals but performs decoding and re-encoding only when it is necessary. This is successful to minimize the deterioration of image quality ascribable to repeated signal conversion including decoding and coding.

The entire disclosure of Japanese patent application No. 123731/1999 filed Apr. 30, 1999 including the specification, claims, accompanying drawings and abstract of the disclosure is incorporated herein by reference in its entirely.

While the present invention has been described with reference to the illustrative embodiments, it is not to be restricted by the embodiments. It is to be appreciated that those skilled in the art can change or modify the embodiments without departing from the scope and spirit of the present invention.

What is claimed is:

1. A coded signal processing device for executing preselected processing with a coded signal representative of a moving picture and coded by a preselected coding system, and outputting a processed coded signal, said coded signal processing device comprising:

a code storage for sequentially storing an input coded signal;

a decoder for decoding the input coded signal to thereby produce an original moving picture signal;

an encoder for re-encoding the moving picture signal output from said decoder by the preselected coding system;

a selector for selectively outputting a coded signal output from said encoder or the coded signal read out of said code storage;

a signal controller for controlling reading of the coded signal out of said code storage, output of the coded signal from said encoder, and switching of said selector, said signal controller causing said code storage or said encoder to output the coded signal based on a preselected reference synchronizing signal which is a reference for a frame synchronizing signal included in the moving picture signal while synchronizing said coded signal frame by frame, and causing said selector to select said coded signal; and a coded signal processor for executing the preselected processing with the coded signal selected by said selector to thereby process the moving picture, and outputting said coded signal in a form of a coded signal.

2. A device in accordance with claim 1, wherein said signal controller comprises:

a synchronizing signal detector for detecting the frame synchronizing signal of the moving picture signal output from said decoder;

a reference synchronizing signal generator for generating the reference synchronizing signal;

a phase detector for comparing the reference synchronizing signal and the frame synchronizing signal detected by said synchronizing signal detector to thereby output a phase difference between said reference synchronizing signal and said frame synchronizing signal; and a timing controller for causing, based on the reference synchronizing signal, the coded signal to be read out of said code storage and output via said selector, said timing controller repeatedly reading, when the phase difference output from said phase detector is smaller than a first preselected value, the coded signal of a preselected frame out of said code storage two times or causing, if said phase difference is greater than a second preselected value, said encoder to re-encode the moving picture signal appearing during a preselected period while omitting the moving picture signal of a preselected frame and said selector to select the coded signal output from said encoder.

3. A device in accordance with claim 2, wherein the input coded input includes intra-coded signals and inter-coded signals appearing at preselected frame intervals, said timing controller causing said code storage to read repeatedly, when the phase difference output from said phase detector is smaller than the first preselected value, the intra-frame coded signal of a frame appearing first after an output of said phase difference out of said code storage two times or causing, when said phase difference is greater than the second preselected value, said encoder to omit one of the inter-coded signals appearing between an intra-coded frame appearing first after the output of said phase difference and a next intra-coded frame while outputting, up to said next intra-coded frame, a coded signal output by re-encoding the moving picture signal of the other frames.

4. A coded signal processing device for executing preselected processing with a first and a second coded signal representative of a particular moving picture each and coded by a preselected coding system while synchronizing said first coded signal and said second coded signal, and outputting processed coded signals, said coded signal processing device comprising:

a first path;

a second path; and a coded signal processor;

said first path and said second path each including:

a code storage for sequentially storing an input coded signal;

a decoder for decoding the input coded signal to thereby produce an original moving picture signal;

an encoder for re-encoding the moving picture signal output from said decoder by the preselected coding system;

a selector for selectively outputting a coded signal output from said encoder or the coded signal read out of said code storage; and a signal controller for controlling reading of the coded signal out of said code storage, output of the coded signal from said encoder, and switching of said selector;

said coded signal processor executing the preselected processing with the coded signal selected by said selector of said first path and said selector of said second path to thereby process the moving picture, and outputting said coded signal in a form of a coded signal.

wherein the first coded signal is input to said code storage and said decoder of said first path while the second coded signal is input to said code storage and said decoder of said second path, said signal controller of said first path and said signal controller of said second path respectively feeding, based on a reference synchronizing signal which is a common reference for frame synchronizing signals of moving picture signals, said first coded signal and said second coded signal to said coded signal processor while synchronizing said first coded signal and said second coded signal frame by frame.

5. A device in accordance with claim 4, wherein said signal controllers of said first and second paths each comprise:

a synchronizing signal detector for detecting the frame synchronizing signal of the moving picture signal output from said decoder;

a reference synchronizing signal generator for generating the reference synchronizing signal;

a phase detector for comparing the reference synchronizing signal and the frame synchronizing signal detected by said synchronizing signal detector to thereby output a phase difference between said reference synchronizing signal and said frame synchronizing signal; and a timing controller for causing, based on the reference synchronizing signal, the coded signal to be read out of said code storage and output via said selector, said timing controller repeatedly reading, when the phase difference output from said phase detector is smaller than a first preselected value, the coded signal of a preselected frame out of said code storage two times or causing, if said phase difference is greater than a second preselected value, said encoder to re-encode the moving picture signal appearing during a preselected period while omitting the moving picture signal of a preselected frame and said selector to select the coded signal output from said encoder.

6. A device in accordance with claim 5, wherein the first coded signal and the second coded signal each include intra-coded signals and inter-coded signals appearing at preselected frame intervals, said timing controller causing said code storage to read repeatedly, when the phase difference output from said phase detector is smaller than the first preselected value, the intra-coded signal of a frame appearing first after an output of said phase difference out of said code storage two times or causing, when said phase difference is greater than the second preselected value, said encoder to omit one of the inter-coded signals appearing between an intra-coded frame appearing first after the output of said phase difference and a next intra-coded frame while outputting, up to said next intra-coded frame, a coded signal output by re-encoding the moving picture signal of the other frames.

7. A coded signal processing device for executing preselected processing with a first coded signal and a second coded signal representative of a moving picture each and coded by a preselected coding system while synchronizing said first coded signal and said second coded signal to each other, and outputting processed coded signals, said coded signal processing device comprising:

a first code storage for sequentially storing the first coded signal;

a first decoder for decoding the first coded signal to thereby produce an original moving picture signal;

an encoder for re-encoding the moving picture signal output from said first decoder by the preselected coding system;

a selector for selectively outputting a coded signal output from said encoder or the coded signal read out of said first code storage;

a signal controller for controlling reading of the coded signal out of said first code storage, output of the coded signal from said encoder, and switching of said selector;

a second code storage for sequentially storing the second coded signal;

a second decoder for decoding the second coded signal to thereby produce an original moving picture signal; and a coded signal processor for executing the preselected processing with the coded signal output from said selector and the coded signal output from said second code storage to thereby process the moving picture, and then outputting said first coded signal and second coded signal in a form of coded signals.

8. A device in accordance with claim 7, wherein said signal controller comprises:

a first synchronizing signal detector for detecting the frame synchronizing signal of the moving picture signal output from said first decoder;

a second synchronizing signal detector for detecting the frame synchronizing signal of the moving picture signal output from said second decoder;

a phase detector for comparing the frame synchronizing signals output from said first and second synchronizing signal detectors to thereby output a phase difference between said frame synchronizing signals; and a timing controller for causing, based on the frame synchronizing signal output from said second synchronizing signal detector, the coded signal to be read out of said first code storage and output via said selector, said timing controller repeatedly reading, when the phase difference output from said phase detector is smaller than a first preselected value, the coded signal of a preselected frame out of said first code storage two times or causing, if said phase difference is greater than a second preselected value, said encoder to re-encode the moving picture signal appearing during a preselected period while omitting the moving picture signal of a preselected frame and said selector to select the coded signal output from said encoder.

9. A device in accordance with claim 8, wherein the first coded signal input include intra-coded signals and inter-coded signals appearing at preselected frame intervals, said timing controller causing said first code storage to read repeatedly, when the phase difference output from said phase detector is smaller than the first preselected value, the intra-frame coded signal of a frame appearing first after an output of said phase difference out of said first code storage two times or causing, when said phase difference is greater than the second preselected value, said encoder to omit one of the inter-coded signals appearing between an intra-coded frame appearing first after the output of said phase difference and a next intra-coded frame while outputting, up to said next intra-coded frame, a coded signal output by re-encoding the moving picture signal of the other frames.

10. A method of processing a coded signal representative of a moving picture coded by a preselected coding system while synchronizing said coded signals, said method comprising the steps of:

(a) decoding the coded signal to thereby detect a synchronizing signal picture by picture;

(b) comparing the synchronizing signal with a preselected reference synchronizing signal to thereby detect a phase difference;

(c) temporarily storing the coded signal and reading out said coded signal in accordance with the reference synchronizing signal;

(d) re-encoding one by one moving picture signals produced by decoding the coded signal;

(e) selecting and then processing either one of the coded signal read out in step (c) and a coded signal output by step (d);

(f) repeatedly reading out, when the phase difference detected in step (b) is smaller than a first preselected value, an intra-coded frame two times for synchronization in step (c); and (g) omitting, when the phase difference detected in step (b) is greater than a second preselected value, any one of inter-coded frames of the moving picture signal decoded in step (d) and appearing between two consecutive intra-coded frames, while re-encoding the moving picture signal of the other frames to thereby synchronize the coded signal to the reference synchronizing signal.

* * * * *